United States Patent [19]

Meyer

[11] Patent Number: 4,813,175
[45] Date of Patent: Mar. 21, 1989

[54] MULTI-FUNCTIONAL NURSERY CULTIVATOR

[76] Inventor: Thomas A. Meyer, 1609 Hobe Rd., Woodstock, Ill. 60098

[21] Appl. No.: 77,857

[22] Filed: Jul. 27, 1987

[51] Int. Cl.4 .................. A01C 15/00; A01G 15/00
[52] U.S. Cl. .................................... 47/1.7; 111/6
[58] Field of Search .............. 47/1.5, 1.7; 111/52, 111/73; 172/5, 74, 292; 180/6.48, 14.2; 280/481

[56] References Cited

U.S. PATENT DOCUMENTS

| | | | |
|---|---|---|---|
| 3,012,371 | 12/1961 | Pawela | 47/1.7 |
| 3,117,632 | 1/1964 | Caggiano, Jr. | 172/5 |
| 3,705,560 | 12/1972 | Lappin | 111/85 |
| 3,749,035 | 7/1973 | Cayton et al. | 111/85 |
| 3,913,681 | 10/1975 | Lincoln et al. | 172/5 |
| 4,196,678 | 4/1980 | Lore et al. | 111/10 |
| 4,266,617 | 5/1981 | Mullet et al. | 180/6.48 X |
| 4,372,047 | 2/1983 | Marttinsen | 30/123.7 |
| 4,464,862 | 8/1984 | Peterson et al. | 47/1.5 |
| 4,544,038 | 10/1985 | Schonert | 172/78 |
| 4,567,689 | 2/1986 | Lemans | 47/1.7 |
| 4,583,319 | 4/1986 | Wolff et al. | 47/1.7 |
| 4,586,287 | 5/1986 | Bleasdale et al. | 47/1.7 |
| 4,592,164 | 6/1986 | Ballu | 47/1.5 |

Primary Examiner—Brian S. Steinberger
Attorney, Agent, or Firm—Mathew R. P. Perrone, Jr.

[57] ABSTRACT

A multi-functional nursery cultivator includes a carrier support having a tank assembly operably secured thereto with a spraying assembly operably connected to tank assembly. The carrier support is rendered mobile and is powered by a detachable zero-turning radius tractor. Additionally the spraying assembly can be modified to include a cultivating assembly.

9 Claims, 7 Drawing Sheets

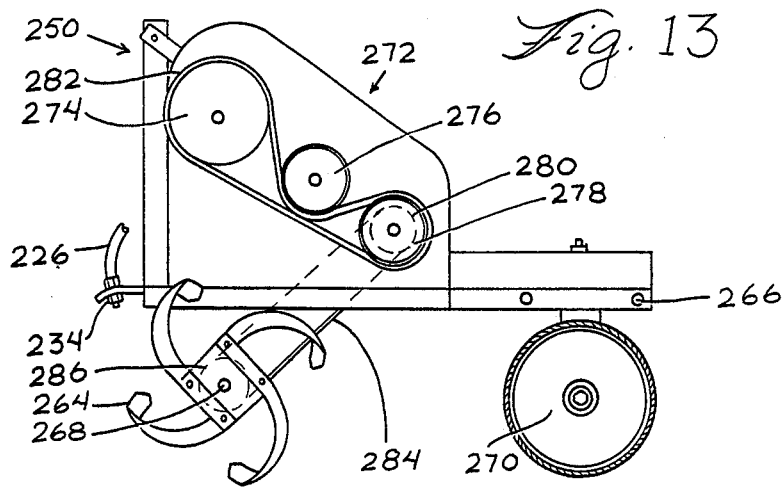
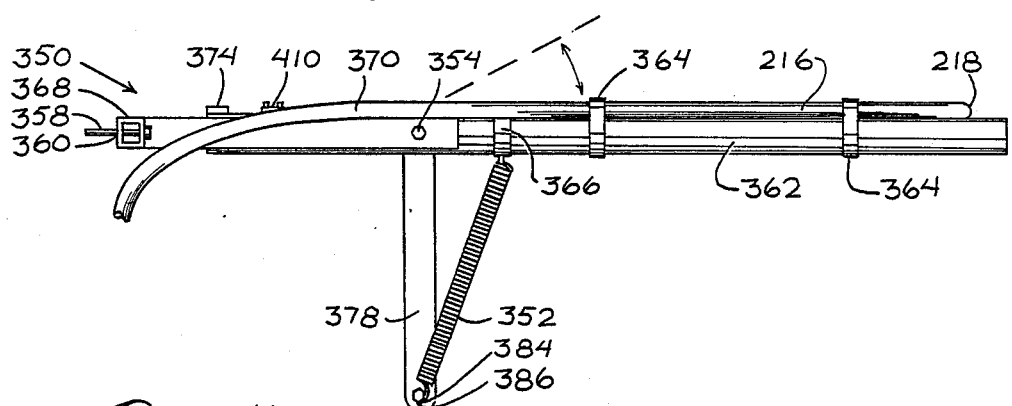
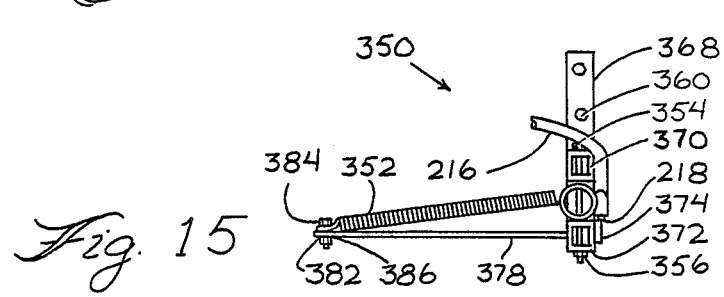
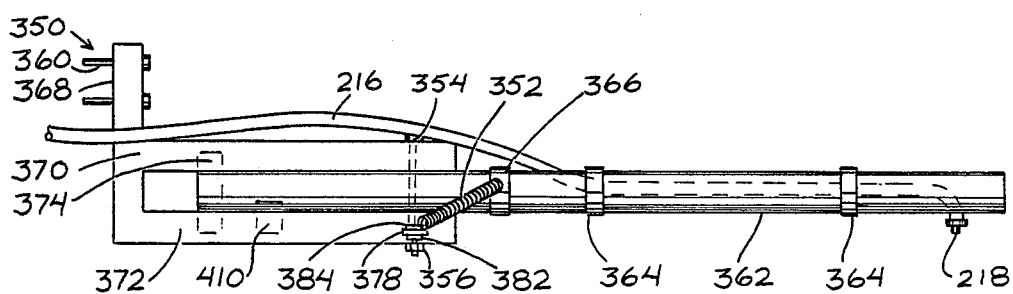

MULTI-FUNCTIONAL NURSERY CULTIVATOR

BACKGROUND OF THE INVENTION

This invention relates to a method and apparatus for treating trees and more particularly to a sprayer or cultivator for tilling around the base of a tree, or fertilizing and applying herbicides to the base of a tree or the cultivated area.

Growth of plants for commercial sale and planting around business structures or residential structures is an extremely important business. Appropriate plants around the structures provide for an improved aesthetic appearance while at the same time giving tremendous ecological benefits. Plants form an important and required part of the photosynthesis process. Photosynthesis is an essential procedure in removing pollutants in the atmosphere. The photosynthesis process is known to be important for the production of oxygen, and hence for life.

However, during construction of both business structures and residential structures, it is extremely difficult to preserve existing trees, plant and other foliage, which are needed for the photosynthesis process. Thus, it is necessary after construction to plant new trees in the appropriate spot. The most efficient way to grow the new trees is to start them at nursery or similar area and then transplant them to the construction area.

Many problems exist with the growing of trees in a nursery or similar area. The best tree growth can occur in bare soil, because there is no other vegetation around to compete with the trees for nutrients in the soil. However, with bare soil, a substantial amount of soil erosion takes place. So while the most effective method of preventing the soil erosion is to have grass in the area with the trees, the grass creates another problem.

Grass competes with the trees for soil nutrients and interferes with the tree growth. While grass cuts tree growth, it does prevent erosion and hold moisture in the ground. Also the nutrients and other factors beneficial to the growth of the tree are not washed away.

Thus, it is a problem of preventing soil erosion, while obtaining the greatest growth in the shortest period of time. The solution to one problem creates a problem in another area. In an attempt to overcome the problems, it is possible to cultivate around the trees, while leaving most of the grass intact. This cultivation can be accomplished in one of the most simple manners by a cultivator with rotary tines for digging the ground.

However, such cultivation requires a substantial amount of additional work, after the cultivation has taken place. It is necessary to hoe around each tree by hand to remove the dirt that has been thrown against the tree by the rototiller.

Many types of trees develop shoots at the base of the tree. These shoots interfere with tree growth, and attract undesirable insects and parasites which also interfere with tree growth. The common term for these shoots are suckers. Generally the suckers must be removed by hand which is a very time consuming procedure.

Additionally, it is desired to fertilize and apply herbicide to promote weed control. Clearly the fertilizing promotes growth and the weed control prevents undesirable plants from using nutrients belonging to the tree. These steps, of course, must be accomplished separately and cause a great deal of trouble and consume a great amount of time in properly caring for the trees.

Further complications are caused by the desirability of having fertilizer incorporated into the ground, while having the herbicide applied to the surface of the ground. These complications appear to mandate a separate application of herbicide and fertilizer. Yet application of fertilizer and herbicide in one operation is highly desirable.

Generally, the cultivation, fertilizing, and application of herbicides are three operations. These three operations require a substantial amount of time. Therefore a combination of at least two of these procedures is useful—if for no other reason than to save time.

It is also desirable to have a multiuse implement. If a power source for a device to accomplish the desired goals can be used in more than one fashion, great advantages are achieved. Thus, a substantial amount of capital is not tied up in the machine with only one purpose.

It is clearly desirable to simplify the caring for trees while preventing soil erosion and promoting maximum growth in the shortest possible period of time.

SUMMARY OF THE INVENTION

Accordingly, among the many objects of this invention, is to provide an apparatus and method for cultivating, fertilizing, and applying a weed killer in one step while minimizing (if not eliminating) all hand work.

A further object of this invention is to provide an apparatus for cultivating around the base of a tree.

A still further object of this invention is to provide an apparatus for applying a herbicide around the base of a tree.

Yet a further object of this invention is to provide an apparatus for applying a fertilizer around a tree.

Also an object of this invention is to provide an apparatus which keeps dirt away from the base of a tree.

Another object of this invention is to provide an apparatus which has many uses.

Still another object of this invention is to provide an apparatus for maintaining nutrients at the base of a tree.

Yet another object of this invention is to provide an apparatus which combines several operations.

A further object of this invention is to provide an apparatus for application of fertilizer and herbicide in the same operation.

A still further object of this invention is to provide an apparatus to minimize the problem of tree shoots.

Yet a further object of this invention is to provide a method for applying a fertilizer around a tree.

Also an object of this invention is to provide a method which keeps dirt away from the base of a tree.

Another object of this invention is to provide a method which has many uses.

Still another object of this invention is to provide a method for maintaining nutrients at the base of a tree.

Yet another object of this invention is to provide a method which combines several operations.

A further object of this invention is to provide a method for application of fertilizer and herbicide in the same operation.

A still further object of this invention is to provide a method to minimize the problem of tree shoots.

Yet a further object of this invention is to provide a method for improving tree growth rates.

Also an object of this invention is to provide a method for cultivating around the base of a tree.

Another object of this invention is to provide a method for applying and an herbicide around the base of a tree.

These and other objects of this invention (which other objects become clear by considering the specifications, claims and drawings as a whole) are met by providing a sprayer or a sprayer-tiller combination unit capable of being operated by a zero-turning radius tractor.

BRIEF DESCRIPTION OF THE DRAWINGS

FIG. I depicts a front, perspective view of the nursery cultivator 10 including tractor 12 and carrier assembly 14.

FIG. II depicts a rear, perspective view of the spray carrier 450 with pump switch assembly 350 attached.

Figure 1:
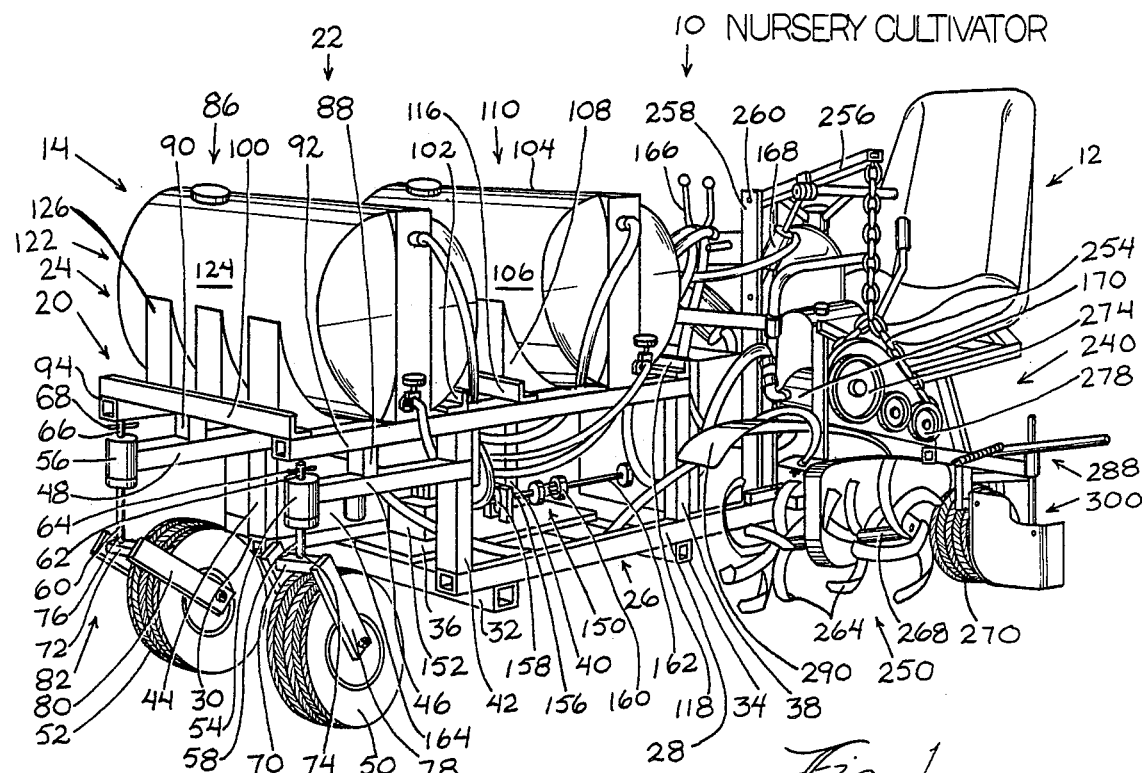
Figure 2:
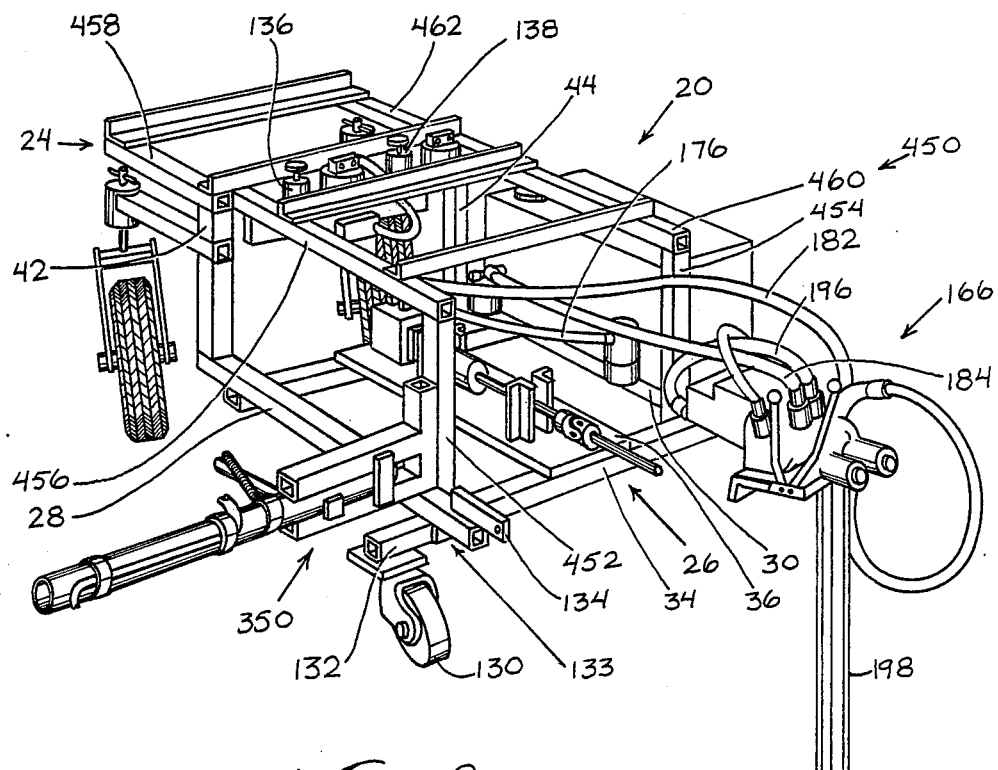
Figure 3:
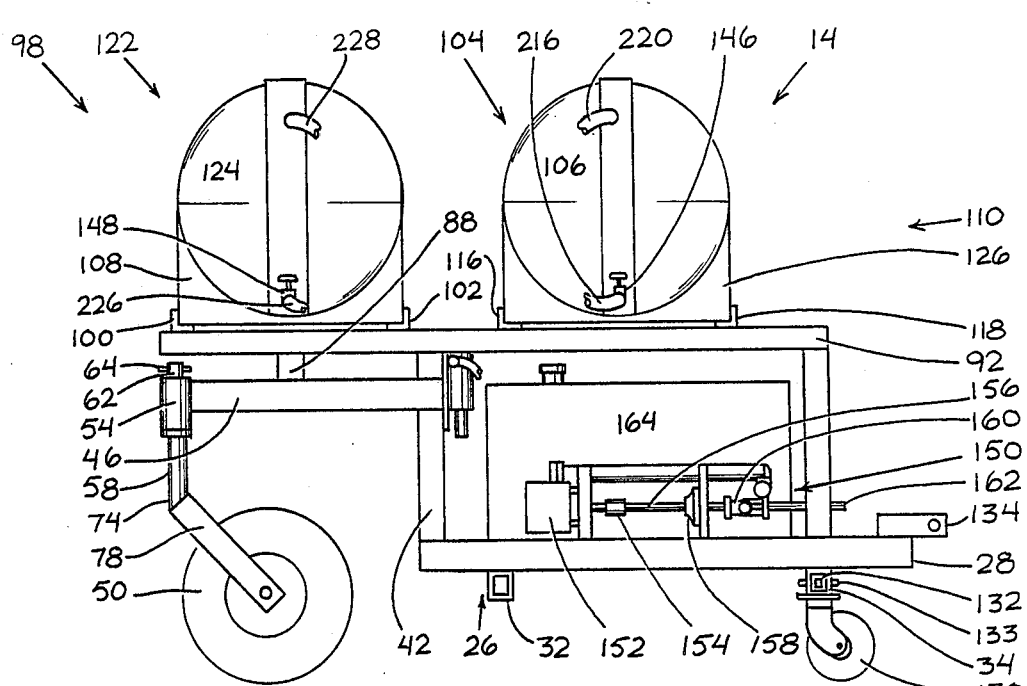
Figure 4:
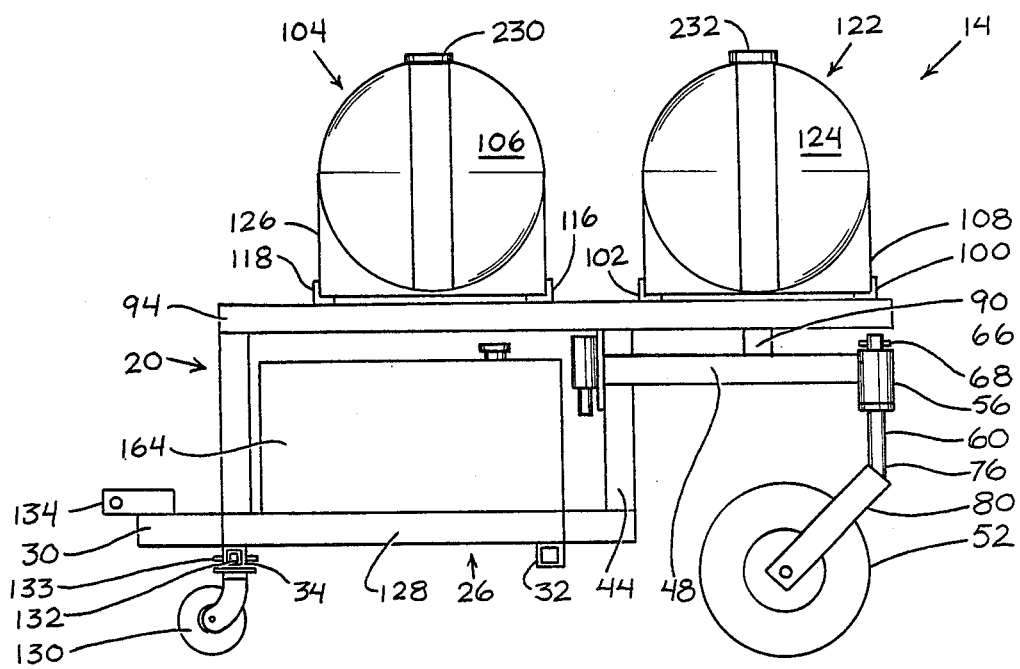
Figure 5:
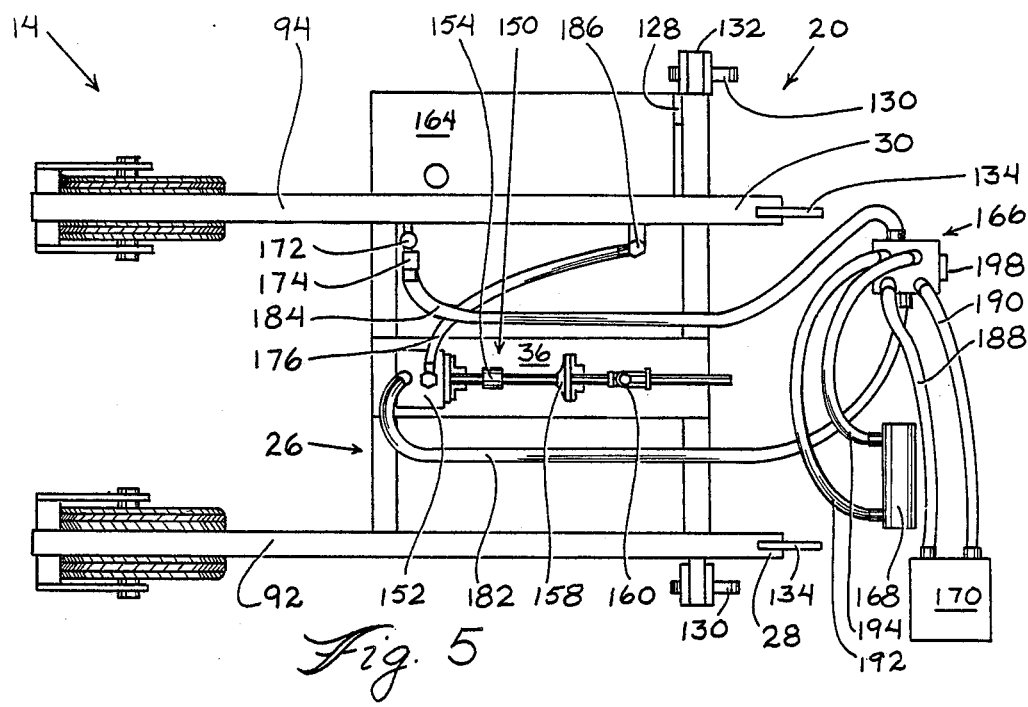
Figure 6:
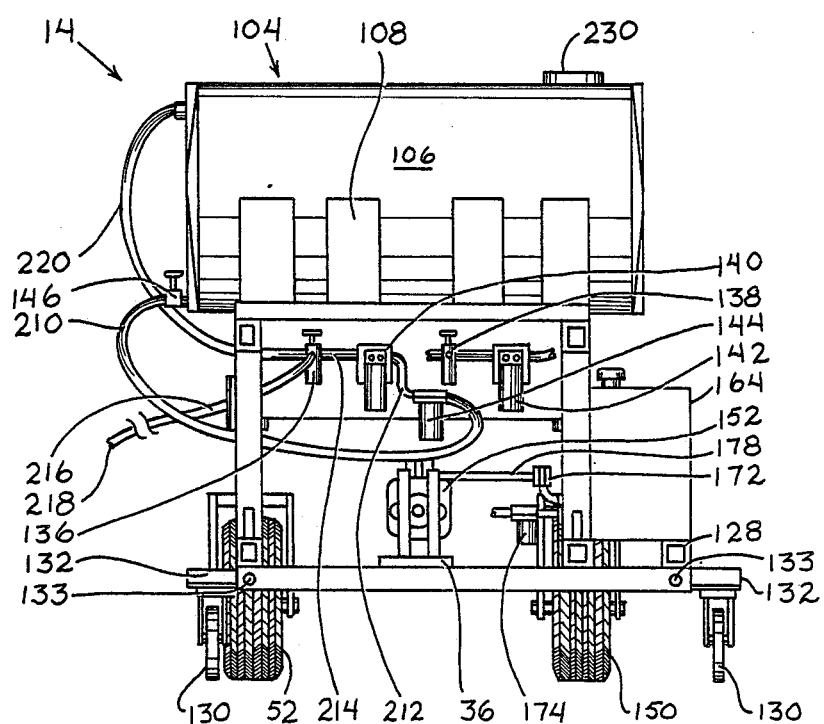
Figure 7:
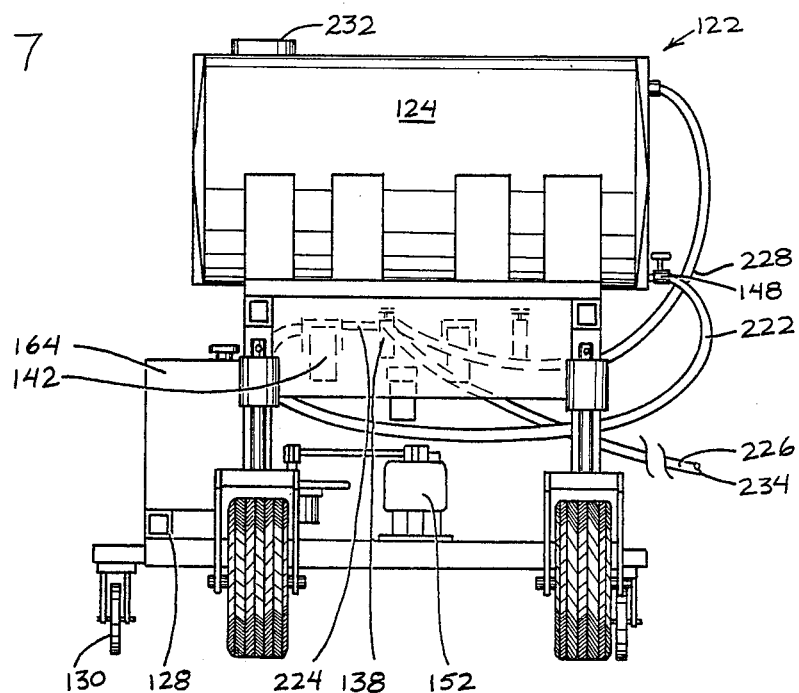
Figure 8:
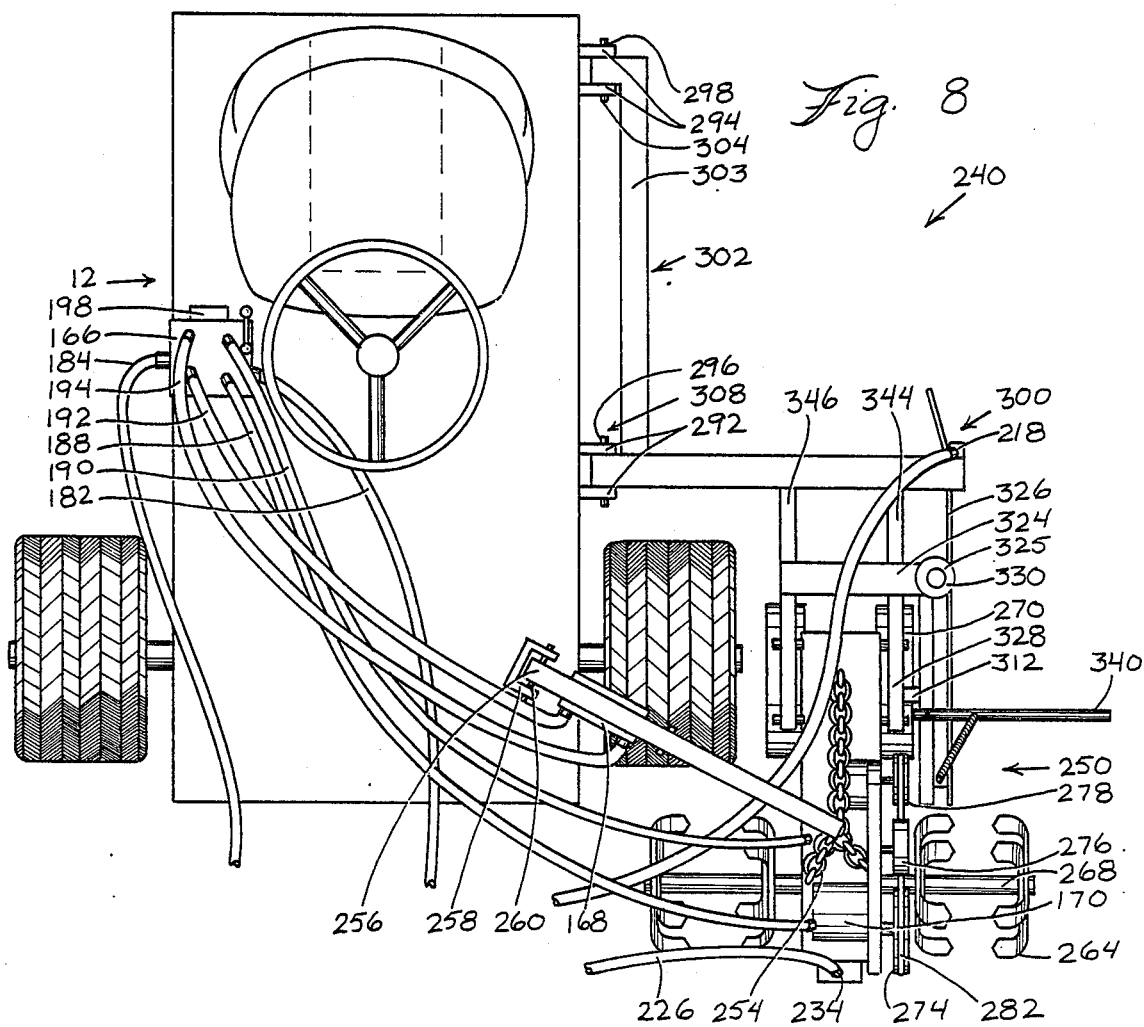
Figure 9:
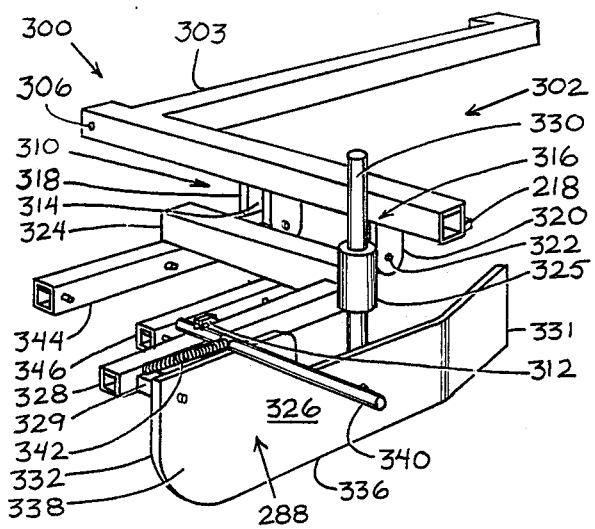
Figure 10:
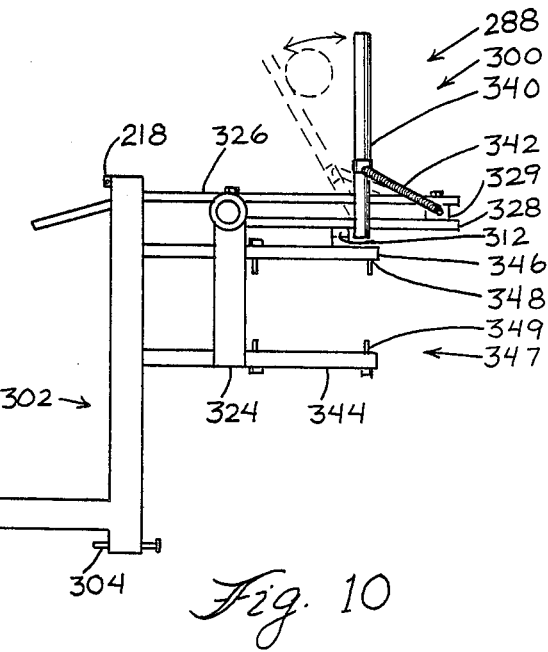
Figure 11:
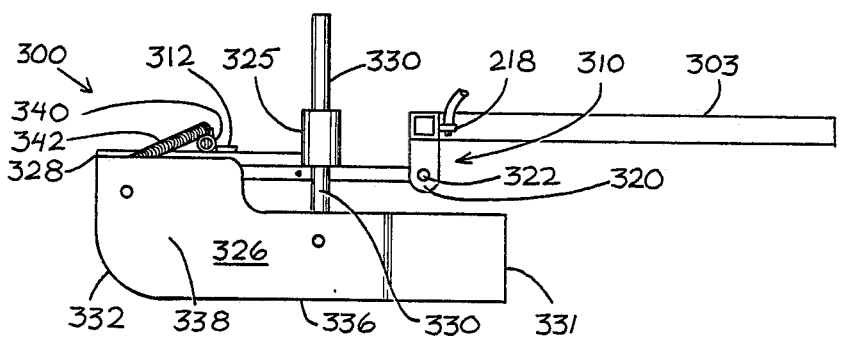
Figure 12:
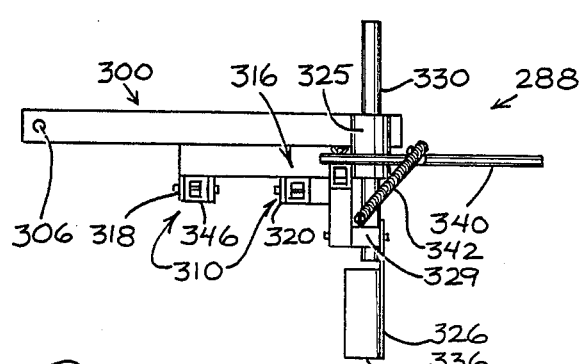
Figure 17:
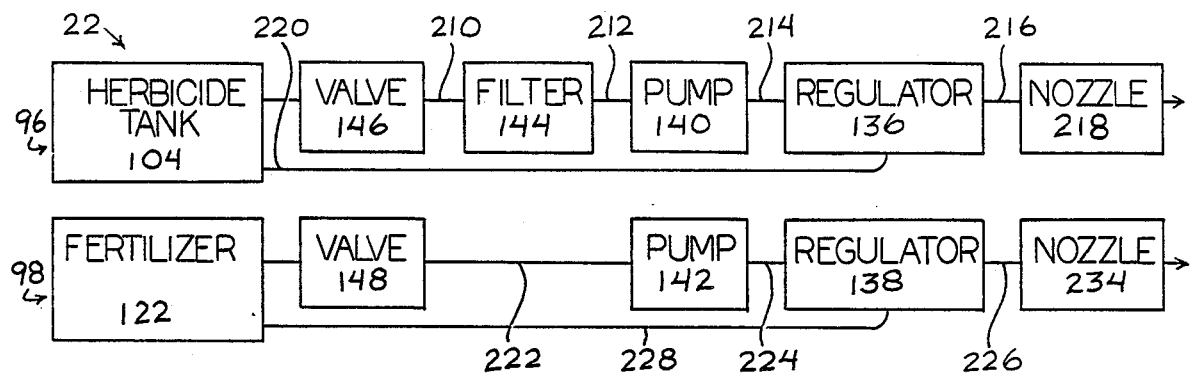
Figure 18:
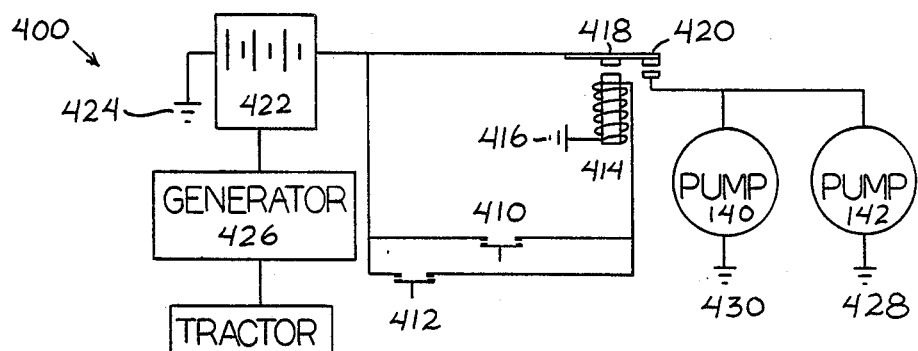
Figure 19:
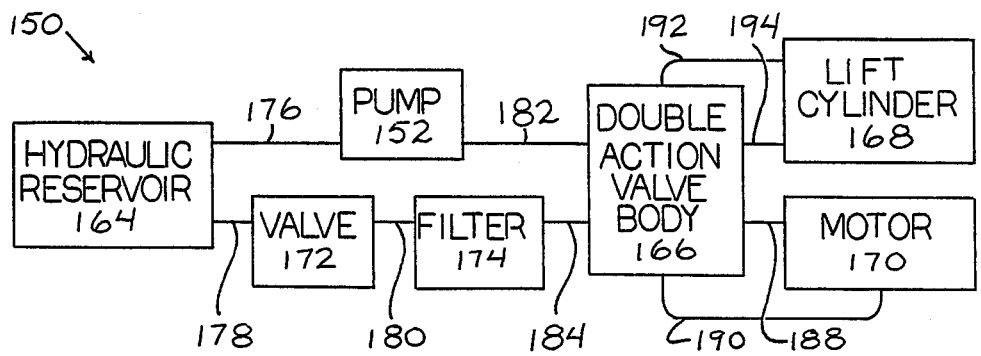

FIG. III depicts a side, plan view of carrier assembly 14.

FIG. IV depicts a side, plan view of carrier assembly 14, which is a reverse view of FIG. III.

FIG. V depicts a top, plan view of tank support 20.

FIG. VI depicts an end, plan view of tank support 20, showing herbicide tank 104.

FIG. VII depicts an end, plan view of tank support 20, showing fertilizer tank 122, which is a reverse view of FIG. VI.

FIG. VIII depicts a top, plan view of cultivator assembly 240 attached to tractor 12.

FIG. IX depicts a front, perspective view of the tree shield assembly 300.

FIG. X depicts a top, plan view of the tree shield assembly 300.

FIG. XI depicts a side, plan view of the tree shield assembly 300.

FIG. XII depicts a front, plan view of the tree shield assembly 300.

FIG. XIII depicts a side, plan view of the pulley assembly 272 for tiller assembly 250.

FIG. XIV depicts a top, plan view of the pump switch assembly 350.

FIG. XV depicts an end, plan view of the pump switch assembly 350, as seen when viewing spray carrier 450 from the side thereof.

FIG. XVI a side, plan view of the pump switch assembly 350, as seen when viewing spray carrier 450 from the front thereof.

FIG. XVII depicts a block diagram of tank assembly 22.

FIG. XVIII depicts a circuit diagram of the lever switch assembly 410, as seen when viewing spray carrier 450 from the side thereof.

FIG. XIX depicts a block diagram of the hydraulic assembly 150.

Throughout the Figures of the drawings, where the same part appears in more than one Figure, the same numerical designation is applied thereto.

DESCRIPTION OF THE PREFERRED EMBODIMENTS

A multi-functional apparatus for use in a nursery setting or other setting as a cultivator or a sprayer includes a carrier support having a tank assembly operably secured thereto with a spraying assembly operably connected to tank assembly. The carrier support is rendered mobile and is powered by a detachable zero-turning radius tractor. Additionally the spraying assembly can be modified to include a cultivating assembly.

Referring now to FIG. I, nursery cultivator 10 includes a tractor 12 capable of maneuvering carrier assembly 14 to achieve desired cultivation, fertilization, and herbicide application around trees in one operation. The trees may be in a nursery or a lawn.

Carrier assembly 14 includes tank support 20, cultivator assembly 240, hydraulic assembly 150, tree shield assembly 300 and tiller switch assembly 288. Tank support 20 includes a tank assembly 22. Tank assembly 22 includes a tank frame 24 with a herbicide tank 104 and a fertilizer tank 122 mounted on the tank frame 24. Tank frame 24 includes a frame base 26, which supports front wheel assembly 82, forward tank support 100, and rear tank support 110.

Frame base 26 includes a first base longitudinal member 28 and a second base longitudinal member 30. First base longitudinal member 28 and second base longitudinal member 30 are substantially parallel to each other. First base cross member 32 and second base cross member 34 join first base longitudinal member 28 and second base longitudinal member 30 to form a basically rectangular shaped for frame base 26. Connecting first base cross member 32 to second base cross member 34 is hydraulic support shelf 36 for the purpose of supporting hydraulic assembly 150 thereon.

As a further part of tank frame 24, frame base 26 supports a first rear vertical member 38 and second rear vertical member 40 mounted perpendicularly at a corner formed by first base longitudinal member 28 and second base cross member 34. Second rear vertical member 40 is situated at a corner formed by second base longitudinal member 30 and second base cross member 34. First forward vertical member 42 is situated forward of the intersection of first longitudinal member 28 and first base cross piece 32 on first longitudinal member 28. Likewise second forward vertical member 44 is situated forward of the second base longitudinal member 30 and the first base cross piece 32 intersection, on base second base longitudinal member 30.

First forward vertical member 42 has protruding therefrom a first castor arm 46. First castor arm 46 is generally parallel to first longitudinal member 28. In a like fashion, second castor arm 48 protrudes from second forward vertical member 44. Front wheel assembly 82 is supported by first castor arm 46 and second castor arm 48. First castor arm 46 receives first castor wheel 50. Second castor arm 48 receives second castor wheel 52. The rotation and castor flexibility of first castor wheel 50 is met by first rotation cylinder 54 as the rotation capability of second castor wheel 52 is met by second rotation cylinder 56.

Within the first rotation cylinder 54 is the first wheel arm 58. First wheel arm 58 is secured in first rotational cylinder 54 at first pin end 62 by first pin 64. Second wheel arm 60 is secured in second rotational cylinder 56 at second pin end 66 by second pin 68. Thus, first castor wheel 50 and second castor wheel 52 provide for tank frame 24 and permit tractor 12 to move tank frame 24.

Oppositely disposed from first pin end 62 on first wheel arm 58 at first bar end 74 is first bar 70. In a like fashion, second bar 72 is secured to second wheel arm 60 at second bar end 76, and is oppositely disposed from second pin 68. First tire arm pair 78 provides a pair of arms protruding from first bar 70 to receive first castor wheel 50 therebetween. Again in a like fashion, second tire arm pair 80 receives second castor wheel 52 therebetween.

Forward tank support 86 is supported above first castor arm 46 and second castor arm 48. Forward tank support 86 is supported by first forward pillar 88 and second forward pillar 90 which are mounted on first castor arm 46 and second castor arm 48 in symmetrical fashion. First forward pillar 88 and second forward pillar 90 support first top longitudinal arm 92 and second top longitudinal arm 94. Also supporting first top longitudinal arm 92 is first rear vertical member 38. Also supporting second top longitudinal arm 94 is second rear vertical member 40. First top longitudinal arm 92 is substantially parallel to and above both first castor arm 46 and first base longitudinal member 28. Second top longitudinal arm 94 is substantially parallel to and above both second castor arm 48 and second base longitudinal member 30.

First top longitudinal arm 92 and second top longitudinal arm 94 form a top part of tank frame 24 with appropriate cross members secured as connecting members therefor. Cross members on first top longitudinal arm 92 and second top longitudinal arm 94 provide the forward tank support 86. These cross members are first forward tank support 100 and second forward tank support 102. First forward tank support 100 and second forward tank support 102 are both secured to first top longitudinal arm 92 and second top longitudinal arm 94 at opposing portions thereof. Between first forward tank support 100 and second forward tank support 102, fertilizer tank 122 is mounted.

Fertilizer tank 122 includes a fertilizer tank cylinder 124. Fertilizer tank cylinder 124 is supported at various points by three pairs of fertilizer cylinder braces 126. Fertilizer cylinder braces 126 provide for fertilizer tank 122 to fit directly between and in contact with first forward tank support 100 and second forward tank support 102.

Additional cross members secured to first top longitudinal arm 92 and second top longitudinal arm 94 provide the rear tank support 110. These cross members are first rear tank support 116 and second rear tank support 118. In this fashion, herbicide tank 104 may be supported in substantially the same fashion as fertilizer tank 122. Herbicide tank 104 includes herbicide tank cylinder 106 and herbicide cylinder braces 108.

Fertilizer tank 122 and herbicide tank 104 are interchangeable as to position on forward tank support 86 and rear tank support 110. All that is noted is that a filter 144 is required in the line for the herbicide tank 144 (shown in FIG. VI).

Hydraulic support shelf 36 provides support for the hydraulic assembly 150. The hydraulic assembly 150, as mounted on hydraulic support shelf 36, includes a hydraulic pump 152 connected to a pump connector 154 (commonly known as a love joy connector). Pump connector 154 (shown in FIG. III) is then connected to a pump shaft 156. The pump shaft 156 includes a shaft bearing 158 to support it and simplify the connections. Then adjacent the shaft bearing 158 is a universal joint 160 to assist the functioning of the hydraulic assembly 150.

A power take off shaft 162 leads from the universal joint 160 to the tractor 12, and permits connecting of the tractor 12 to the hydraulic system 150, in order to provide power therefor. A hydraulic reservoir 164 (also shown in FIG. III) is mounted adjacent second base longitudinal member 30. Hydraulic reservoir 164 provides the fluid and is connected to hydraulic pump 152 so that the hydraulic assembly 150 may have an adequate supply of fluid. The double action valve body 166 is secured to second cross member 34 so that the double action valve body 166 is adjacent tractor 12. In this fashion, nursery cultivator 10 and in particular carrier assembly 14 may be operated from the tractor 12.

The double action valve body 166 provides for a number of hydraulic connections. These standard hydraulic connections permit appropriate direction of hydraulic power to appropriate parts of the nursery cultivator 10.

Still considering FIG. I, the cultivator assembly 240 includes a tree shield assembly 300, and lift chain 254 for lifting the tiller assembly 250. The lift chain 254 is secured at one end to a lifting arm 256. The lifting arm 256 has an arm support 258 secured to first longitudinal member 28 in a vertical fashion. Arm support 258 has an arm pivot 260 therein. Lift cylinder 168 is secured at one end to lifting arm 256 and at the other end to arm support 258 to thereby provide for hydraulic lifting of the tiller assembly 250.

It is not always necessary to lift the tiller assembly 250. When trees are in a nursery setting, merely increasing the speed of the tractor 12 prevents substantial digging into the grass. In a lawn setting, that digging is undesirable. So, the tiller assembly 250 must be lifted.

The tiller assembly 250 of cultivator assembly 240 includes tines 264 of a standard type. Tines 264 do the digging and plowing. Tines 264 are driven by a tine wheel 278 while being mounted on a tine shaft 268. Tiller wheels 270 support the tiller assembly 250 and permit the driving of the tines 264. The hydraulic motor 170 drives the power take off wheel 274 which permits the tiller assembly 250 to work and provide the cultivating aspect of cultivator 10.

Tiller assembly 250 further includes tine shield 290. Tine shield 290 provides protection from the tines 264 for the operator of tractor 12. Tine shield 290 is welded or other secured to tiller assembly 250.

Tractor 12 is any zero radius turning tractor. A preferred tractor is a Howard Mower, which may be hydrostatically controlled. With the hydrostatic control of the tractor 12, the speed can be adjusted very efficiently and very quickly to achieve the desired tilling functions of the cultivator 10.

In FIG. II, removable wheel 130 can be seen as having removable arm 132 for taking the removable wheel 130 away from the tank frame 24. The removable wheel 130 is attached by a pin and key arrangement 133 when it is desired to separate the carrier assembly 14 from tractor 12. Protruding outwardly from first base longitudinal member 28 is tractor attachment 134. Tractor attachment 134 is a bar with a pin aperture therein for the purposes of locking the tank support 20 to tractor 12. Herbicide regulator 136 serves herbicide tank 104 (shown in FIG. I) while fertilizer regulator 138 serves fertilizer tank 122 (shown in FIG. I) in dispensing desired material.

The carrier in FIG. II is distinct from the carrier in FIG. I with slight modifications. FIG. I depicts a cultivator carrier assembly 14 connected to tractor 12. FIG. II depicts the pump switch assembly 350 which does not include cultivator assembly 240 (shown in FIG. I). Thus, the FIG. II is purely a sprayer carrier 450. Whereas in FIG. I, cultivator carrier assembly 14 can both spray and cultivate.

The structure of FIG. II is different from FIG. I. FIG. I depicts a carrier assembly 14. FIG. II depicts a sprayer carrier 450. For in FIG. II, while frame base 26 is same as FIG. I, first rear sprayer arm 452 and second sprayer rear arm 454 are secured differently than first rear vertical member 38 and second rear vertical member 40, although they are substantially similar thereto in appearance. First rear sprayer arm 452 is secured within the intersection of first base longitudinal member 28 and rear cross member 34. Likewise, second rear sprayer arm 454 is secured within the intersection of second base longitudinal member 30 and rear cross member 34.

This requires replacement of first top longitudinal member 92 with first rear arm 456 and first forward arm 458. Also this requires replacement of second top longitudinal member 92 with second rear arm 460 and second forward arm 462. First rear arm 456 is secured to the top of first rear sprayer arm 452, and to the side of first forward vertical member 42. Second rear arm 460 is secured to the top of second rear sprayer arm 454, and to the side of second forward vertical member 44. First forward arm 458 is secured to the top of first forward vertical member 42. Second forward arm 462 is secured to the top of second forward vertical member 44. In all other features, FIG. II is substantially similar to FIG. I but for some minor length adjustments.

Referring now to FIG. III, a side of FIG. I with cultivator assembly 240 removed is depicted. Herbicide tank 104 is depicted as a rear tank adjacent tractor attachment 134. A section of herbicide regulator hose 220 is depicted as connected in a standard fashion to a top portion of herbicide tank 104. First top longitudinal arm 92 is shown as supporting herbicide tank 104. By the same token, first forward pillar 88 supports first top longitudinal arm 92 and thereby supports fertilizer tank cylinder 124. First forward pillar 88 is, of course, between first castor arm 46 and first top longitudinal arm 92 to provide the support. As is clear from the discussion of FIG. I, first forward vertical member 42 protrudes upwards from first base longitudinal member 28 and provides support for first top longitudinal arm 92.

In a like fashion, fertilizer nozzle hose 226 is depicted as connected to fertilizer valve 148 with a fertilizer regulator hose 228 shown as connected in standard fashion to a top of fertilizer tank 122. First top longitudinal arm 92 is shown as supporting a fertilizer tank 122. It is clear that the positions of fertilizer tank 122 and herbicide tank 104 can be reversed with the appropriate amount of adjustment in the hose connections. A herbicide valve 146 controls the flow of fluid from herbicide tank 104 through herbicide nozzle hoze 216, while a fertilizer valve 148 controls the flow of fluid from fertilizer tank 122.

Also depicted is a side view of hydraulic assembly 150. Hydraulic pump 152 is shown as secured to a pump connector 154 (preferrably of the love joy type) then to a pump shaft 156. Pump shaft 156 then passes into pump bearing 158 to minimize wear thereon. Pump shaft 156 is then connected to universal joint 160. Universal joint 160 provides a connecting point between pump shaft 156 and power takeoff shaft 162 in order to permit the carrier assembly 14 to be connected to tractor 12. Hydraulic reservoir 164 is a tank which provides the hydraulic fluid for the functioning of the hydraulic mechanism.

In FIG. IV, a reverse view of FIG. III is depicted. In this fashion, the hydraulic reservoir 164 is depicted, along with a fertilizer tank 104 and herbicide tank 122 are depicted. Also more clearly seen in this view is the herbicide cap 230 on the top of the herbicide tank 104 and the fertilizer cap 232 on the top of fertilizer tank 122. These caps provide for filling of the tanks and permit air to enter as the fluid in either is depleted.

In FIG. III, FIG. IV, FIG. V and FIG. VI, it is clear that the hydraulic assembly 150 is mounted on hydraulic support shelf 36. Hydraulic support shelf 36 connects forward cross member 32 and rear cross member 34. Hydraulic support shelf 36 is generally a flat piece of stock steel capable of holding the hydraulic assembly 150.

As is clear from considering FIG. III and FIG. IV, removable wheel 130 is attached thereto in pairs. Removable arm 132 fits into rear cross member 34 in view of the fact that rear cross member is a piece of square stock steel and removable arm 132 secured to removable wheel 130 is also a piece of square stock steel capable of inserting into rear cross member 34 in a male-/female relationship. Removable wheel 130 is then locked into cross member 34 by wheel key pin arrangement 133. The wheel key pin arrangement 133 is a standard arrangement well known in the art. The removable wheels 130 are suitable for use when the carrier assembly 14 is separated from the tractor 12.

Referring now to FIG. V, a top view of carrier assembly 14 is shown with the frame base 26 being basically depicted and the hydraulic support shelf 36 being depicted with the hydraulic assembly 150 thereon. In this fashion, a very clear picture of the hydraulic assembly 150 is obtained. Double action valve body 166 (shown also in FIG. II) is mounted adjacent the tractor 12 by a key and pin arrangement. Double action valve body 166 has a mounting bar 198 (shown in FIG. II) suitable for attaching the controls thereof adjacent to tractor 12. A key and pin arrangement permits this to occur.

The hydraulic assembly 150 includes a hydraulic motor 170 attached to the cultivator assembly 240 for driving the tiller assembly 250 (shown in FIG. I). Between the hydraulic reservoir 164 and the hydraulic filter 174 is a straight valve 172 for controlling the flow of hydraulic fluid therethrough. From the hydraulic filter 174, is run a first filter hose 184 to double action valve body 166.

From double action valve body 166, a lift cylinder input hose 192 is also run to the lift cylinder 168 for lifting the cultivator assembly 240. Lift cylinder output hose 194 returns hydraulic fluid to the double valve body 166. In a like fashion, motor input hose 188 runs from the double action valve body 166 to the hydraulic motor 170 on cultivator assembly 240. Motor output hose 190 runs from the hydraulic motor 170 back to the double action valve body 166 permitting the flow of the hydraulic fluid to provide the power to drive the tines 264 of the tiller assembly 250. A hydraulic pump hose 182 runs from the double action valve body 166 to the hydraulic pump 152.

Between the hydraulic pump 152 and hydraulic reservoir valve 186 is a first reservoir hose 176 which provides for flow of hydraulic fluid between the hydraulic pump 152 and the rest of the hydraulic assembly 150. In this fashion, power to lift and drive the cultivator assembly 240 is provided. In the event that only the spraying assembly shown in FIG. II is desired, a cap hose 196 (shown in FIG. II) may connect the valves on the double action valve body 166, and permit the fluid just to flow back and forth therethrough in order to achieve the desired results without the presence of tiller assembly 250. Alternatively, double action valve body 166 may be replaced with a valve elimnating the outlet and inlet connected by the cap hose 196. In the hydraulic assembly 150, the hose, the valve and other part connections are standard hydraulic connections.

Referring now to FIG. VI, a depiction of the herbicide tank 104 is shown. The herbicide tank 104 has a herbicide valve 146 thereon. Herbicide valve 146 is connected by herbicide valve hose 210 to filter 144. Filter 144 is connected by filter hose 212 to herbicide pump 140. Herbicide pump 140 is connected by herbicide pump hose 214 to herbicide regulator 136. Herbicide regulator 136 is a dual valve device having a herbicide valve hose 216 leading to herbicide nozzle 218. Also, off of herbicide regulator 136 is a herbicide regulator hose 220 leading back to the top of herbicide tank 104. In this fashion, the amount of herbicide is controlled and recirculated to the tank as needed. Also in FIG. VI, the position of hydraulic filter 174 is depicted.

Considering FIG. VI in conjunction with FIG. XVII, the herbicide tank 104 is similar to the fertilizer tank 122 but for the presence of a herbicide filter 144 between the herbicide valve 146 and the herbicide pump 140. Herbicide valve 146 is directly connected to herbicide tank 104 by a standard nipple connection. Herbicide valve 146 is also connected to herbicide filter 144 by herbicide valve hose 210. Herbicide filter 144 is connected to herbicide pump 140 by herbicide filter hose 212. Herbicide pump 140 is connected to herbicide regulator 136 by herbicide pump hose 214. Herbicide regulator 136 is connected to herbicide nozzle 218 by herbicide nozzle hose 216. Also running from and attached to herbicide regulator 136 is herbicide regulator hose 220 running from the regulator 136 back to the herbicide tank 104 to adjust the amount of herbicide flowing through the herbicide nozzle 218.

Considering FIG. VII in conjunction with FIG. XVII, in operation the fertilizer tank 122 is directly connected to a fertilizer valve 148. The fertilizer valve hose 222 connects the fertilizer pump 142 and the fertilizer valve 148. The fertilizer pump hose 224 connects the fertilizer pump 142 and the fertilizer regulator 138. From the fertilizer regulator 138, a fertilizer nozzle hose 226 proceeds to fertilizer nozzle 234 and can apply the fertilizer to the ground. A second hose protruding out of the fertilizer regulator 138 is the fertilizer regulator hose 228 which runs from the fertilizer regulator 138 back to the fertilizer tank 122 to recirculate and control the amount of fertilizer emanating from the fertilizer nozzle 234.

Referring now to FIG. VIII, FIG. IX, FIG. X, FIG. XI and FIG. XII as a group, tree shield assembly 300 is depicted. To obtain an idea of relative positions, FIG. VIII is a top plan view of nursery cultivator 10, with tractor 12 and tree shield assembly 300 in proper position. FIG. IX is a perspective view of tree shield assembly 300. FIG. X is a top, plan view of tree shield assembly 300. FIG. XI is a side, plan view of tree shield assembly 300. FIG. XII is a front, plan view of tree shield assembly 300.

Tree shield assembly 300 includes a shield frame 302. A plurality of keys 304 and key apertures 306 make up bracket pin assembly 308 permit the tree shield assembly 300 to be attached to the tractor 12 (as shown in FIG. VIII). In FIG. VIII, forward tractor bar 292 is welded or otherwise secured to tractor 12 as is rear tractor bar 294. Forward tractor bar 292 and rear tractor bar 294 are positioned as desired to hold tree shield assembly 300. Preferably, forward tractor bar 292 is closer to tank support 20 than is rear tractor bar 294.

Forward tractor bar 292 has a first tractor bar aperture 296 oppositely disposed from its welded end to receive bracket pin assembly 308. In a like fashion, rear tractor bar 294 has a second tractor bar aperture 298 oppositely disposed from its welded end to receive bracket pin assembly 308 and combine to secure tree shield assembly 300 to tractor 12.

Bracket pin assembly 308 provides the base for attaching the tree shield assembly 300 to the frame tractor 12. Blade bracket 310 provides the basis for attaching blade 326 to the shield frame 302. Blade bracket 310 includes a first blade slot 314 and a second blade slot 316 for the purpose of securing the blade 326 to the shield frame 302.

The tree shield assembly 300 also includes the shield frame 302 and the blade 326. The shield frame has a key 304 and a key aperture 306 making up bracket pin assembly 308 for holding the shield frame 302 on the tractor 12 as described with reference to FIG. VIII. Shield frame 302 is basically L-shaped with the top leg 303 of the L-shape being secured to frame 24.

Top leg 303 has secured thereto herbicide nozzle 218 at point adjacent the second arm pair 320. In this fashion, herbicide is applied after cultivation and not mixed into the soil by tiller assembly 250. Any suitable position for herbicide nozzle 218 must avoid incorporation of the herbicide into the ground in order to maintain the efficacy of the herbicide. Thus an appropriate position and mounting for the herbicide nozzle 218 can be obtained as long as these parameters are met.

The blade bracket assembly 310 is secured to shield frame 302, and includes a first blade slot 314 and a second blade slot 316 formed by a pair of arms including first arm pair 318 and second arm pair 320. Blade bracket assembly also includes slot pin 322, which provides for attaching first tiller bar 344 through first arm pair 318 and second tiller bar 346 through second blade slot 316 to second arm pair 320. Tiller bar assembly 347 includes a plurality of tiller bar apertures 348 and tiller bar pins 349 situated on first tiller bar 344 and second tiller bar 346 for the purpose of securing tiller assembly 250 to tree shield assembly 300.

Welded or otherwise secured to first tiller bar 344 and second tiller bar 346 is blade arm 324. The blade arm 324 has welded or otherwise secured thereto a blade brace 328 and blade cylinder 325. Blade brace 328 supports blade bar 329 and cylinder pump arm 340. Blade rod 330 is slideably mounted in blade cylinder 325. Together blade rod 330 and blade bar 329 support blade 326.

Blade 326 has a curved end 331 and a rounded end 332 oppositely disposed therefrom. The bottom edge of blade 326 is a ground contact 336. The forward part edge of blade 326 is an enlarged portion 338. Enlarged portion 338 is between pump arm 340 and blade bar 329. Enlarged portion 338 pushes dirt away from the tree and permits the tree to push pump arm 340 rearwardly to contact pump activator switch 312 and start application of herbicide and fertilizer as desired. Blade 326 prevents piling of cultivated dirt around the base of the tree.

Attached to the pump arm 340 is pump arm spring 342, which returns returns pump arm 340 to its original position after pump activator switch 312. Together, pump arm 340, pump arm spring 342 and pump arm activated switch 312 make up tiller switch assembly 288. Tiller switch assembly 288 operates substantially the same and pump switch assembly 350 and may be attached to tree shield assembly 300 in any standard fashion, which allows the pivoting of pump arm 340.

Referring now to FIG. XIII, the power takeoff wheel 274 for the tiller assembly 250 is secured to the hydraulic motor 170 (shown in FIG. I). This is a standard pulley arrangement between the hydraulic motor 170 and the power takeoff wheel 274. Power takeoff wheel 274 is connected by a V-belt 282 to idler pulley 276 and tine drive wheel 278. Idler pulley 276, tine drive wheel 278, and power takeoff wheel 274 are basically pulleys set up in parallel fashion—in order to form pulley assembly 272.

Tine drive wheel 278 has mounted on the same axle therewith a chain wheel 280. Chain wheel 280 interacts with chain 284. Chain 284 then drives the shaft sprocket 286. Because the shaft sprocket 286 is secured to tine shaft 268, tines 264 rotate with the rotation of the chain 284 and puller tiller wheel 270 along. Tiller wheel 270 is mounted in a standard to support tines 264. Tiller apertures 266 provide for the mounting of tiller assembly 250 to the tiller bar assembly 347 on tree shield assembly 300.

Secured to the tiller assembly 250 over the top of the tines 264 is a tine shield 290 (shown in FIG. I) to protect the tines 264 and the user from the rotating tines 264. Attached to the front of the tiller assembly 250 is the fertilizer nozzle 234. The herbicide nozzle 218 attaches to the rear of shield frame 302 (as seen in FIG. IX, FIG. X, and FIG. XI). In this fashion, the cultivator assembly 240 incorporates the fertilizer into the ground while the herbicide remains on the top to kill the undesired weeds, and the undesired sucker which appear on the trees and interfere with the growth thereof.

Referring now to FIG. XIV, FIG. XV, and FIG. XVI as a unit, the pump switch assembly 350 shown in FIG. II is more clearly depicted. Pump switch assembly 350 is also shown in FIG. II as a variation of the carrier assembly 14 not using the cultivator assembly 240. The pump switch assembly 350 includes a frame bar 368 with an upper pipe bar 370 and a lower pipe bar 372 to receive pipe 362 therebetween. Lower pipe bar 372 forms an "L"-shape with frame bar 368. Upper pipe bar 370 is substantially parallel to lower pipe bar 372. A pair of hose clamps 364 hold herbicide nozzle hose 216 or fertilizer nozzle hose 226 in position. Frame bolts 352 through frame apertures 360 in frame bar 368 connect pump switch assembly 350 to spray carrier 450 at first rear sprayer arm 452.

A pipe spring clamp 366 holds one end of pipe switch spring 352 to pipe 362. Protruding from and secured to lower pipe bar 372 is spring arm 378. The opposing end of pipe spring 352 is secured to spring arm 378 by spring nut 382 and spring bolt 384. Pipe spring 362 is pivotally mounted to upper pipe bar 370 and lower pipe bar 372 by pivot bolt 354 and pivot nut 356. Switch spring 352 returns pipe 362 to position between upper pipe bar 370 and lower pipe bar 372 after pipe 362 has been pivoted to activate lever switch 410. Pipe brace 374, attached (by welding or otherwise securing) to upper pipe bar 370 and lower pipe bar 372, assures that pipe 362 will return to its original position.

Pipe 362 may be of sufficient length to reach under a tree with low boughs and apply herbicide, fertilizer or insecticide thereto. Pump switch assembly 350 may be used on either spray carrier 450 or carrier assembly 14. Likewise, cultivator assembly 240 may be used on either spray carrier 450 or carrier assembly 14.

Referring now to FIG. XVII, a schematic box diagram is shown of the herbicide tank assembly 96 and the fertilizer tank assembly 98, which form part of tank assembly 22. All parts of the herbicide tank assembly 96 and the fertilizer tank assembly 98 may be connected in any standard fashion and connected to the tank frame 24 in any standard fashion. Typical examples of connections are nut and bolt assemblies, welded points, key pin assemblies and other such devices known in the art.

When considering the lever switch assembly 400 as depicted in FIG. XVIII, the electric circuitry operating the herbicide pump 140 and the fertilizer pump 142 is shown. Herbicide pump 140 is connected to herbicide pump ground 430. In a like fashion fertilizer pump 142 is connected to fertilizer pump ground 428. Herbicide pump 140 and fertilizer pump 142 are also connected to pump contact 420. Solenoid contact 418 is activated by pump contact 420 with the activation of solenoid 414. Solenoid ground 416 completes the circuit for the solenoid 414.

Lever switch 410 is wired in series with the solenoid 414 and the storage battery 422. Bypass switch 412 is wired in parallel with lever switch 410. In this fashion, the pumps may be operated by bypass switch 412 without contact with a tree. Storage battery 422 is grounded at battery ground 424. Storage battery 422 is also connected to a generator 426, which runs off the power of tractor 12 by a generator V-belt 282 arrangement in order to achieve constant charging of the battery 422. Pump arm activated switch 312 operates in the same fashion as lever switch 410 and can substituted in this diagram. In this fashion, the electrical circuitry for the pumps is permitted to operate.

Referring to the hydraulic assembly 150 as depicted in the block diagram of FIG. XIX, the hydraulic reservoir 164 is connected in two fashions. First reservoir hose 176 connects hydraulic reservoir to hydraulic pump 152. Second reservoir hose 178 connects hydraulic reservoir 164 to straight valve 172. Straight valve 172 is connected to hydraulic filter 174 by hydraulic valve hose 180. Hydraulic filter 174 is connected to double action valve body 166 by first filter hose 184. Double action valve body 166 is connected to hydraulic motor 170 in a circuitous fashion by motor input hose 188, which passes hydraulic fluid to motor 170 in order to permit motor 170 to function.

In the same token motor output hose 190 permits hydraulic fluid to pass from motor 170 back to double action valve body 166 t achieve the desired function in the motor. Double action valve body 166 is also connected to hydraulic pump 152 by hydraulic pump hose 182. Hydraulic pump hose 182 permits the flow of hydraulic fluid from the hydraulic pump 152 to the double action valve body 166.

The double action valve body 166 is also connected to lift cylinder 168. Lift cylinder 168 permits the raising of the tiller assembly 250 as desired. Double action valve body 166 is connected to lift cylinder 168 by lift cylinder input hose 192 which carries hydraulic fluid to the lift cylinder 168 and by lift cylinder output hose 194 which takes the fluid away from lift cylinder 168 as desired. In this fashion, the hydraulic system 150 is permitted to operate.

Connections between various parts of the apparatus disclosed herein are well-known in the art. Hydraulic connections and tank hoses are secured in any standard non-leaking fashion. Hoses for hydraulic fluids, fertilizers, herbicides, or insecticides are well-known in the as are the connections therefor. The frame is bolted, welded or otherwise secured together in order to support the device as desired. Hoses, filters, pumps and other parts are mounted as desired, unless a specific mounting place is specified herein.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modifications of this method and apparatus can become clear to a person having ordinary skill in this particular art. Such modifications are clearly covered by this disclosure.

What is claimed and sought to be protected by Letters Patent of the United States is:

1. A multi-functional nursery cultivator, for applying fertilizer and herbicide while selectively cultivating an area, including a carrier asssembly, a tank support, a spraying assembly, a cultivating assembly, and a detachable zero-turning radius tractor; wherein
   a. said carrier assembly includes said tank support operably secured thereto;
   b. said tank support includes said tank assembly;
   c. said detachable zero-turning radius tractor provides motive power for said carrier support;
   d. said tank assembly is operably connected to said spraying assembly;
   e. said carrier assembly further includes a hydraulic assembly for operating said cultivating assembly;
   f. said tank assembly includes a herbicide tank and a fertilizer tank;
   g. said spraying assembly is operably connected to said herbicide tank and said fertilizer tank;
   h. a pair of castor wheels are operably connected to said carrier assembly at a wheel end thereof;
   i. said detachable zero-turning radius tractor is secured to said carrier assembly at a tractor end thereof;
   j. said wheel end is oppositely disposed from said tractor end;
   k. said detachable zero-turning radius tractor is hydrostatically operated to achieve adjustments in speed;
   l. said hydraulic assembly is operably connected to said detachable zero-turning radius tractor;
   m. said hydraulic assembly provides a lifting means for said cultivating assembly;
   n. a means for attaching a pair or removable wheels to said carrier assembly is situated at said tractor end;
   o. said carrier assembly further includes a cultivating assembly and a tree shield assembly;
   p. a fertilizer nozzle applies fertilizer to an area;
   q. said fertilizer nozzle cooperates with said cultivating assembly to incorporate fertilizer into the ground being cultivated;
   r. a herbicide nozzle applies herbicide to the top of the ground being cultivated;
   s. said fertilizer nozzle is connected to said fertilizer tank by a fertilizer hose;
   t. said herbicide nozzle is connected to said herbicide tank by a herbicide hose;
   u. said tree shield assembly includes a shield frame and a shield blade;
   v. said shield frame is secured to said tractor;
   w. said shield blade is secured to said shield frame; and
   x. said sprayer assembly further includes a pump switch assembly to serve as a bypass switch for said lever switch wherein said bypass switch is in parallel to said lever switch.

2. The multi-functional nursery cultivator of claim 1 wherein said sprayer assembly further includes a pump switch assembly operable from said tractor to selectively spray said area.

3. The multi-functional nursery cultivator of claim 1 wherein said sprayer assembly further includes a lever switch assembly operable by tree contact.

4. The multi-functional nursery cultivator of claim 3 wherein said sprayer assembly further includes said lever switch assembly having an elongated lever.

5. The multi-functional nursery cultivator of claim 1 wherein:
   a. said herbicide hose includes a herbicide pump between said fertilizer nozzle and said fertilizer tank; and
   b. said fertilizer hose includes a fertilizer pump between said fertilizer nozzle and said fertilizer tank.

6. A multi-functional nursery cultivator, for applying fertilizer and herbicide while selectively cultivating an area, including a carrier assembly, a tank support, a spraying assembly, a cultivating assembly, and a detachable zero-turning radius tractor; wherein:
   a. said carrier assembly includes said tank support operably secured thereto;
   b. said tank support includes said tank assembly;
   c. said detachable zero-turning radius tractor provides motive power for said carrier support;
   d. said tank assembly has said spraying assembly operably connected to said tank assembly;
   e. said carrier assembly further includes a hydraulic assembly;
   f. said tank assembly includes a herbicide tank and a fertilizer tank;
   g. a pair of castor wheels are operably connected to said carrier assembly at a wheel end thereof;
   h. said detachable zero-turning radius tractor is secured to said carrier assembly at a tractor end thereof; and
   i. said wheel end is oppositely disposed from said tractor end.
   j. said detachable zero-turning radius tractor is hydrostatically operated to achieve adjustments in speed;
   k. said hydraulic assembly is operably connected to said detachable zero-turning radius tractor;
   l. said hydraulic assembly provides a lifting means for said cultivating assembly;
   m. a means for attaching a pair of removable wheels to said carrier assembly is situated at said tractor end;
   n. said carrier assembly further includes a cultivating assembly and a tree shield assembly;
   o. a fertilizer nozzle applies fertilizer to said area;
   p. said fertilizer nozzle cooperates with cultivating assembly to incorporate fertilizer into the ground being cultivated;
   q. a herbicide nozzle applies herbicide to the top of the ground being cultivated;
   r. said fertilizer nozzle is connected to said fertilizer tank by a fertilizer hose; and s. said herbicide nozzle is connected to said herbicide tank by a herbicide hose.

7. The multi-functional nursery cultivator of claim 6 wherein:
   a. a tree shield assembly includes a shield frame and a shield blade;
   b. said shield frame is secured to said tractor;
   c. said shield blade is secured to said shield frame;
   d. said cultivating assembly is operably connected to hydraulic assembly;
   e. said herbicide nozzle is secured rearwardly of said shield blade and said cultivating assembly to permit said herbicide to remain on top of said ground;
   f. said fertilizer nozzle is secured forwardly of said cultivating assembly to permit said cultivating assembly to incorporate said fertilizer into said ground;
   g. said sprayer assembly further includes a pump switch assembly operable from said tractor to selectively spray an area;
   h. said sprayer assembly further includes a lever switch assembly operable by tree contact;
   i. said herbicide hose includes a herbicide pump between said fertilizer nozzle and said fertilizer tank;
   j. said fertilizer hose includes a fertilizer pump between said fertilizer nozzle and said fertilizer tank; and
   k. said sprayer assembly further includes a pump switch assembly to serve as a bypass switch for said lever switch wherein said bypass switch is in parallel to said lever switch.

8. The multi-functional nursery cultivator of claim 7 wherein:
   a. said hydraulic assembly provides a lifting means for said cultivating assembly;
   b. a power takeoff shaft operably connects said hydraulic assembly to said tractor;
   c. a hydraulic control is situated adjacent to said tractor control said hydraulic assembly;
   d. a power takeoff wheel for said cultivating assembly is powered by said hydraulic assembly;
   e. said power takeoff wheel is operably connected to said cultivating assembly; and
   f. said lifting means for said cultivating assembly is powered by said hydraulic assembly.

9. A multi-functional nursery spraying device, for applying fertilizer and herbicide to an area, including a carrier assembly, a tank support, spraying assembly, and a detachable zero-turning radius tractor; wherein:
   a. said tractor for maneuvering said carrier assembly to achieve fertilization, and herbicide application around a tree in one operation;
   b. said carrier assembly includes said tank support;
   c. said tank support includes a tank assembly;
   d. said tank assembly includes a tank frame;
   e. said tank frame supports a herbicide tank and a fertilizer tank;
   f. said carrier assembly has a castor wheel end and a tractor end;
   g. said detachable zero-turning radius tractor is removably attached to said tractor end;
   h. said castor wheel end has a pair of castor wheels attached to said castor wheel end;
   i. said pair of castor wheels are spaced apart and support said castor wheel end;
   j. said herbicide tank is connected to a herbicide nozzle and a herbicide pump by a herbicide hose in order to spray said herbicide; and
   k. said fertilizer tank is connected to a fertilizer nozzle and a fertilizer pump by a fertilizer hose in order to spray said fertilizer wherein said bypass switch is in parallel to said lever switch.
   l. an elongated pipe member is movable attached to and protrudes from said carrier assembly;
   m. said pipe member is of sufficient length to reach under a tree with a low bough;
   n. said fertilizer nozzle is secured to said pipe member;
   o. said pipe member is electrically connected to a lever switch;
   p. said lever switch is capable of operating at least one pump selected from the group consisting of said fertilizer pump and said herbicide pump; and
   q. a bypass switch operably connected in parallel to said lever switch and connected to said at least one pump for bypassing said lever switch.

* * * * *